US006272738B1

(12) United States Patent
Holliday et al.

(10) Patent No.: US 6,272,738 B1
(45) Date of Patent: Aug. 14, 2001

(54) HAND OPERATED PRESS FOR INSTALLING CABLE CONNECTORS

(76) Inventors: Randall A. Holliday, 10045 Meade Count, Westminster, CO (US) 80030; Shen-Chia Wong, No. 10, Lane 121, Li-der Rd., Peito District, Taipei (TW)

( * ) Notice: Subject to any disclaimer, the term of this patent is extended or adjusted under 35 U.S.C. 154(b) by 0 days.

(21) Appl. No.: 09/543,338

(22) Filed: Apr. 5, 2000

(51) Int. Cl.[7] ...................................................... B23P 19/00

(52) U.S. Cl. ................................ 29/751; 29/753; 29/760; 29/863; 29/757; 29/761; 72/409.14; 72/409.16

(58) Field of Search ............................. 29/751, 753, 760, 29/863, 761, 764, 757; 72/409.14, 410, 412, 409.16, 481.7, 481.8, 409.12, 466.6; 81/313, 314

(56) References Cited

U.S. PATENT DOCUMENTS

| | | | | |
|---|---|---|---|---|
| 3,325,885 | * | 6/1967 | Ziegler, Jr. et al. | 29/203 |
| 3,630,068 | * | 12/1971 | Floyd, Jr. | 72/410 |
| 5,392,508 | * | 2/1995 | Holliday et al. | 29/751 |
| 5,596,800 | * | 1/1997 | Holliday et al. | 29/751 |
| 5,647,119 | * | 7/1997 | Bourbeau et al. | 29/751 |
| 5,743,131 | * | 4/1998 | Holliday et al. | 72/409.1 |
| 5,934,137 | * | 8/1999 | Tarpill | 72/409.14 |
| 5,983,489 | * | 11/1999 | Jee | 29/751 |
| 6,112,404 | * | 9/2000 | Tarpill | 29/751 |

* cited by examiner

*Primary Examiner*—Allan N. Shoap
*Assistant Examiner*—Minh Trinh
(74) *Attorney, Agent, or Firm*—Dougherty & Troxell

(57) ABSTRACT

Hand operated press for installing cable connectors basically includes two handle bars; a receptacle; and a nose, wherein each handle bar has a grip at its lower end and compression part at its upper end. The receptacle and the base are fixed to receptacle compression parts, and a terminator and an adapter are set on the receptacle and the base. When a compressive force is applied between two grips, both receptacle and base move inward simultaneously so as to engage the adapter and the terminator in one piece. Moreover, the receptacle and the base are replaceable with various sized ones to meet the requirement of compressing terminators of different sizes.

4 Claims, 12 Drawing Sheets

HAND OPERATED PRESS FOR INSTALLING CABLE CONNECTORS

BACKGROUND OF THE INVENTION (1) Field of the Invention

The present invention relates to a hand operated press for installing cable connectors, and more particularly, to a hand operated press which can compress an adapter to an outer sleeve of a cable terminator so as to form joint surface a sealed and smooth crease free continuous surface.

(2) Description of the Prior Art

In coaxial cable manufacturing industry, it is a common practice to connect a standard connector to one end of a coaxial cable using a hand operated crimping press, then again to connect this connector to another corresponding connector or a terminal signal port of a TV set.

A common crimping tool can squeeze a sleeve on a cable terminal creased to form a hexagonal joint. This hexagonally creased joint has a problem that it is unable to ensure a perfect sealing effect at the cable terminal but it is susceptible to ingress of moisture existing in the air into the cable from the cable terminal thereof. As a result, the quality of TV picture is severely degraded, and the cable will be destroyed by corrosion in no time.

In order to solve the above problem, the inventor of the present invention disclosed in earlier days a solution to this problem and applied for patent in U.S.A. by application Ser. No. 09/032,771 (application date (Feb. 28, 1998) in which an adapter and an outer sleeve of a terminator may form a smooth and no creasing continuous surface with perfect water tight property.

For carrying out the above described perfect water tight property of the cable connector, it is absolutely necessary to try out an appropriate compression tool, and fortunately such a compression tool has been successfully developed through the inventor's long time efforts.

SUMMARY OF THE INVENTION

It is the main object of the present invention to provide a hand operated press for installing cable connectors by applying a repeated radial force to a cable connector and also by changing position of lever fulcrum to enhance the lever effect to a great extent, but on the contrary reducing stroke of the lever arm during connecting an adapter to an outlet sleeve of a cable terminator or to an cable end.

For fuller understanding of the nature and objects of the invention, reference should be made to the following detailed description taken in conjunction with the accompanying drawings.

DETAILED DESCRIPTION OF THE PREFERRED EMBODIMENT

Figure 1:
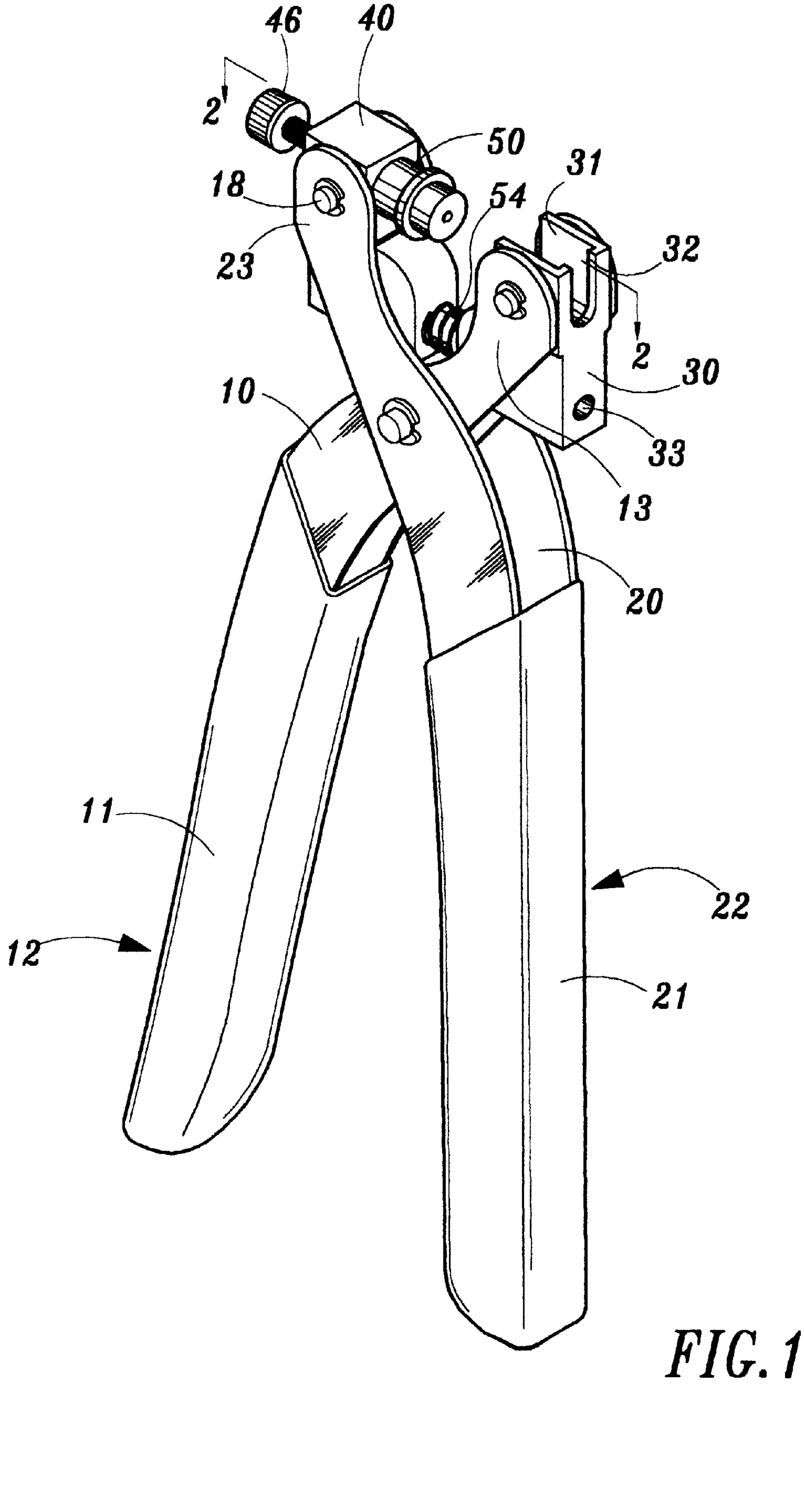
FIG. 1 is a three dimensional exploded view of the present invention.
Figure 2:
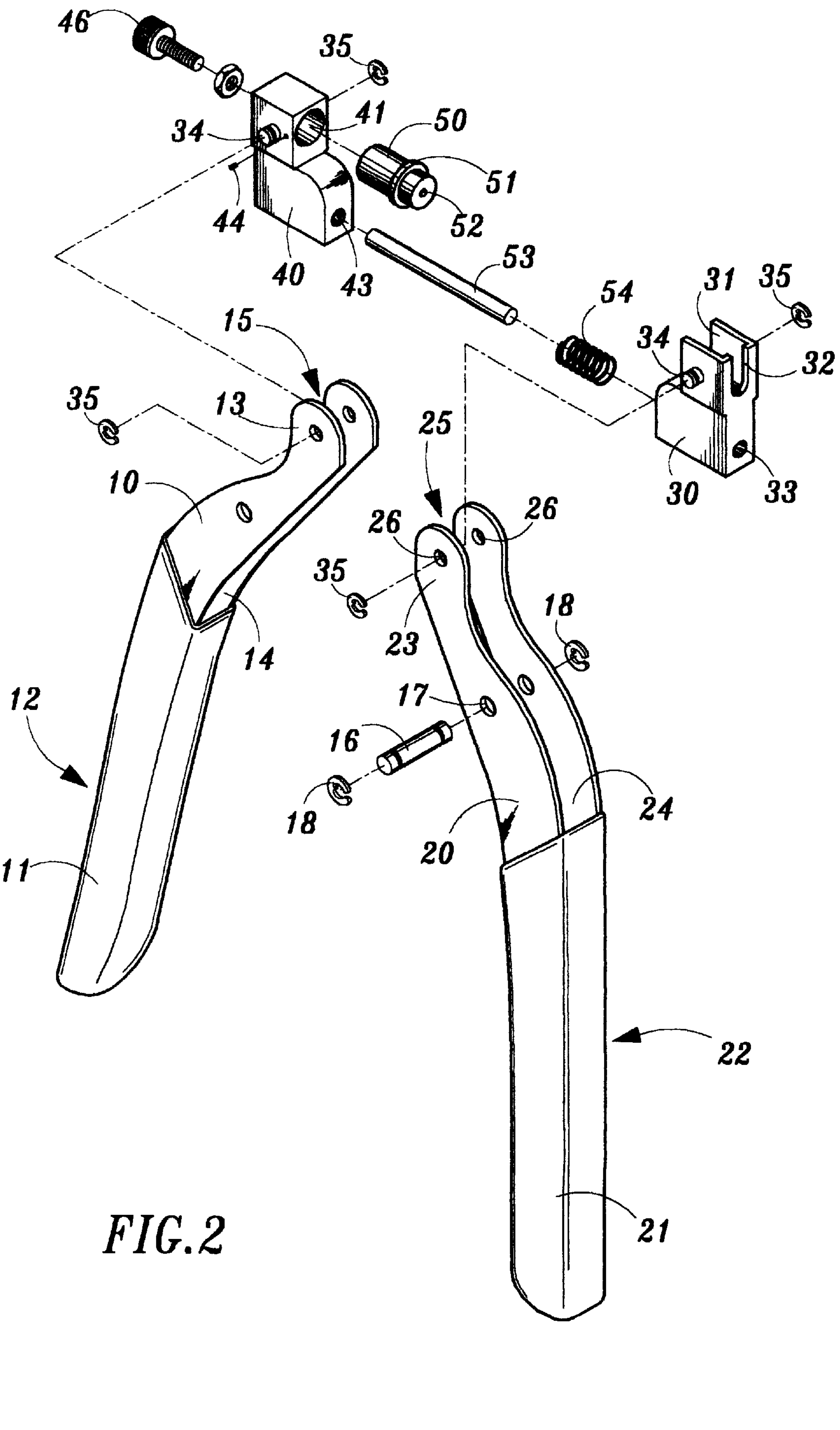
FIG. 2 is a three dimensional exploded view of the present invention.
Figure 3:
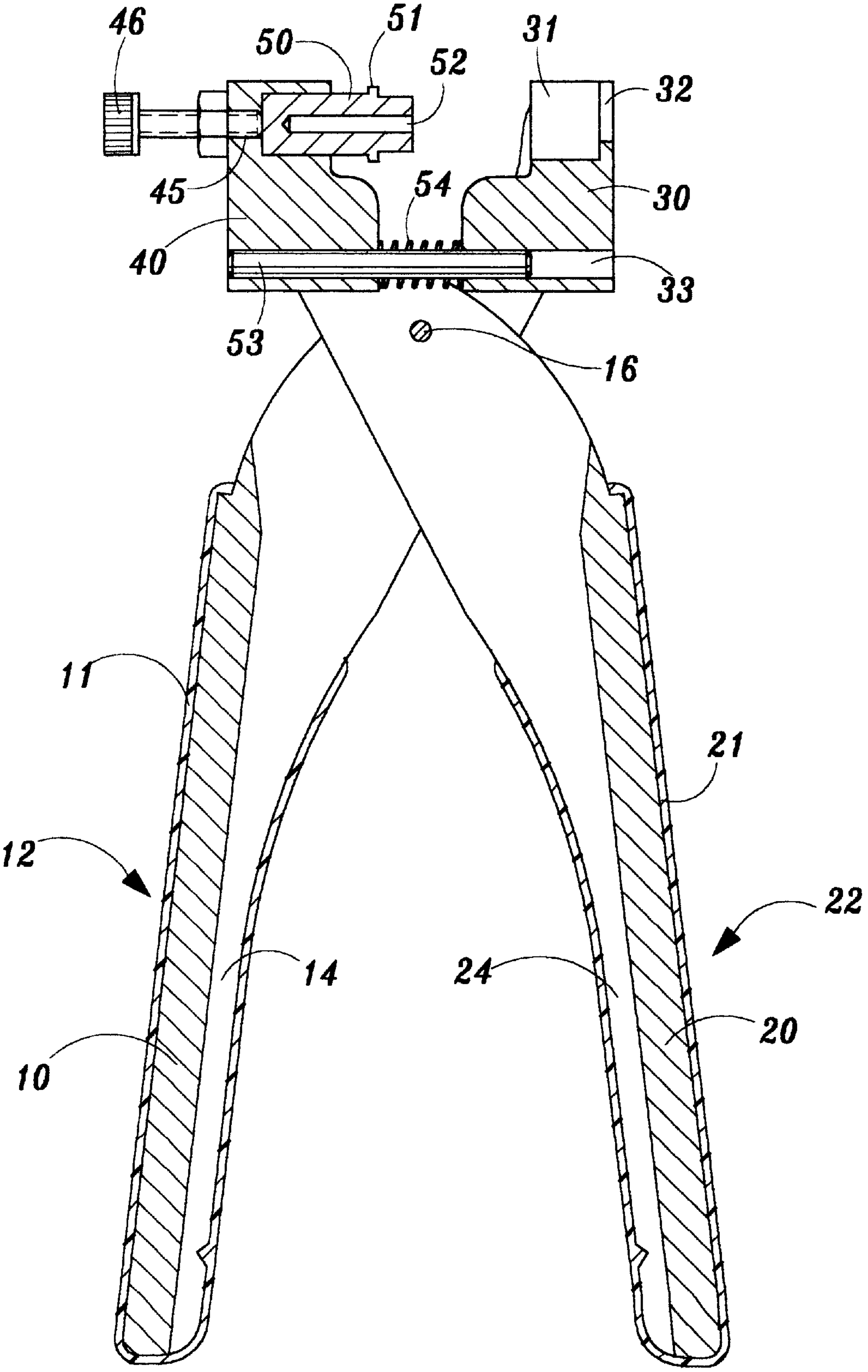
FIG. 3 is a cross sectional view of FIG. 1 being sectioned along line 2—2.

Referring the FIG. 1 through FIG. 3, the hand operated press for installing cable terminator of the present invention includes two handle bars 10,20; a receptacle 30; a base 40, and a pusher rod 50, wherein the handle bars 10,20 are wrapped by a rubberized cloth 11 and 21 respectively to form grips 12 and 22 at the lower ends thereof, while the upper ends are formed into compression parts 13 and 23 each having a slot 14/24 respectively. The slots 14 and 24 lead to openings 15 and 25 at further distant ends respectively. The two handle bars 10,20 are set crosswise with their compression parts 13,23 facing against each other and having a supporting axle 16 inserted into a hole 17 provided at the intersection point of the two handle bars 10 and 20 and then fixed with a c shaped hook 18 so as to operate the handle bars 10,20 with the supporting axle 16 as revolving fulcrum according to lever principle.

Meanwhile, disposing the receptacle 30 and the base 40 in the opening 15 and 25 of the handle bars 10 and 20 respectively so as to pass two posts 34 through the two holes 26 respectively and then use c shaped hooks 35 to hook on the posts 34 such that the receptacle 30 and the base 40 are fixed in the compression parts 13 and 23 of the handle bars 10 and 20.

A die cavity 31 with a flange 32 at one end is provided at the upper end of the receptacle 30 for preventing work pieces to escape the receptacle 30. Here, a fixed hole 41 and a screw hole 45 are formed at the upper end of the base 40. A pusher rod 50 is installed in the fixed hole 41; the rod 50 is fixed thereat by means of a setscrew 44. An adjustable screw 46 is combined to the screw hole 45 so as to finely adjust the pusher rod 50 to its exact position. A stopper ring 51 is provided for the pusher rod 50 at its front end, and an accommodation hole 52 is provided at the middle portion of the pusher rod 50. At the lowest end of the base 40, there is provided a fixing hole 43 with a guide rod 53 fixed one end therein while whose other end is extend into the guide hole 33 of the receptacle 30 so that the receptacle 33 and the base 40 may make parallel linear motion. Besides, a restorable coil spring 54 is installed on the guide rod 53.

Figure 4:
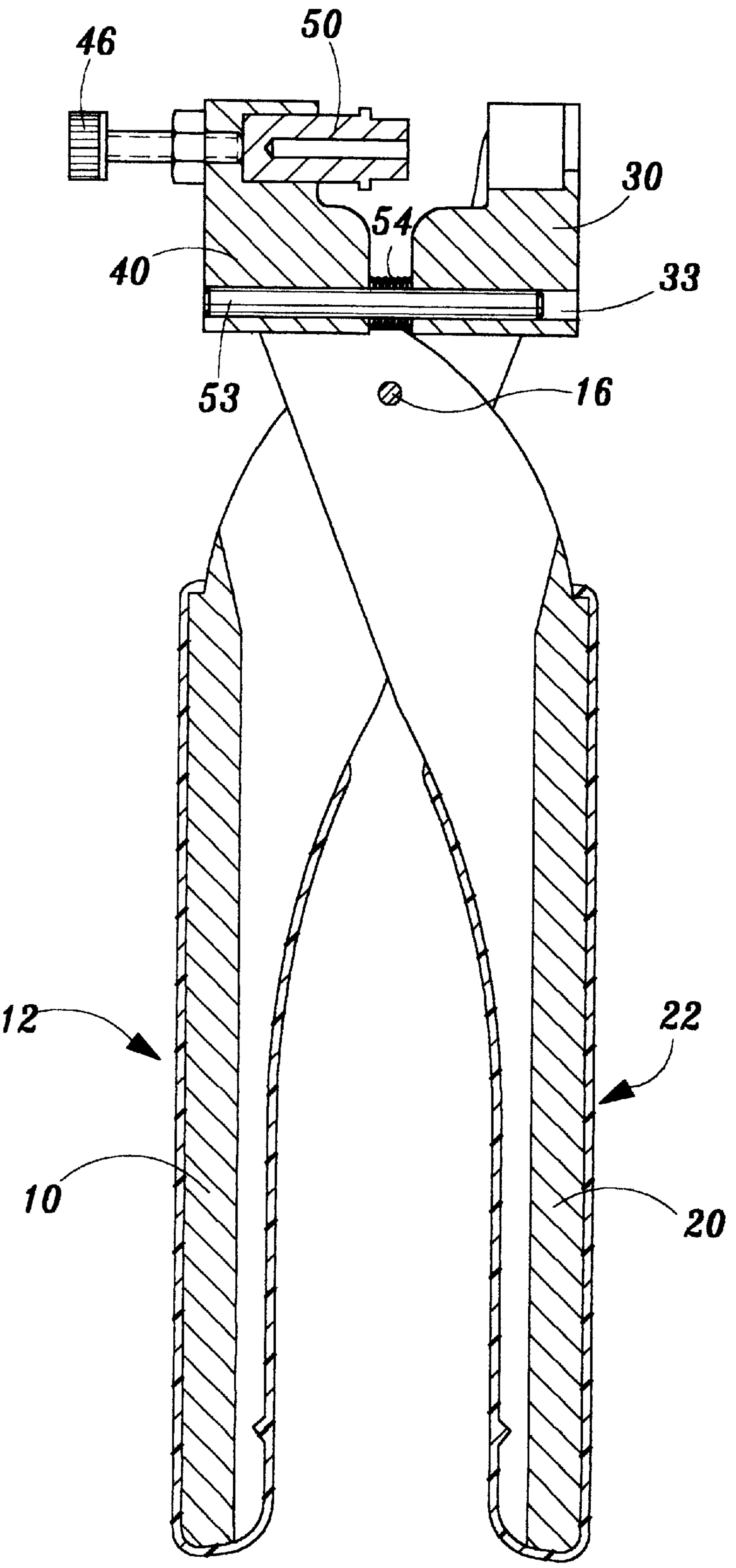
FIG. 4 is a cross sectional view showing the hard operated press of the present invention in clamped state.
Figure 5:
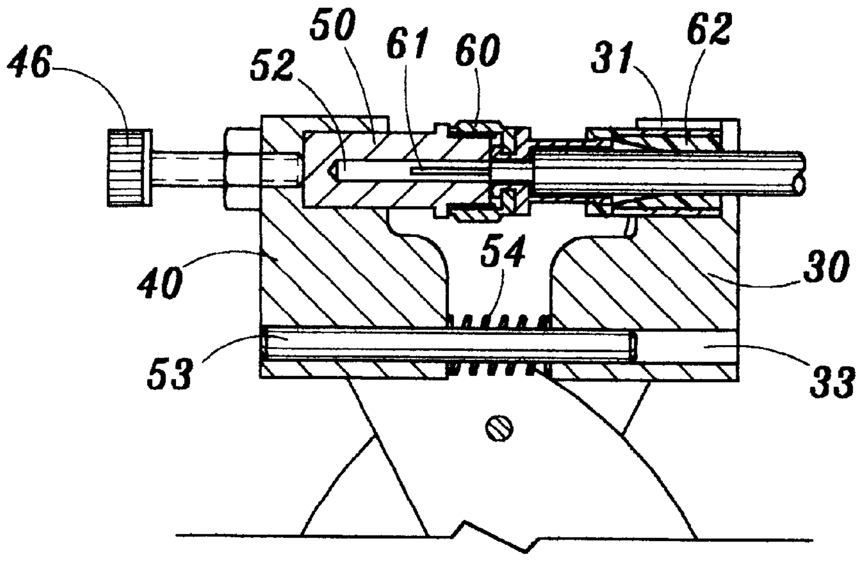
FIG. 5 is a cross sectional view of the present invention containing a cable terminator therein.
Figure 6:
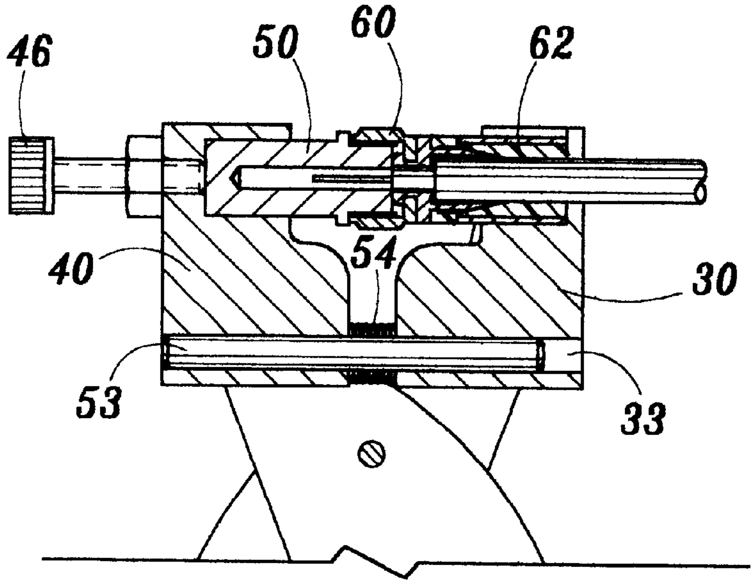
FIG. 6 is a cross sectional view showing the state that the hand operating press of the present invention compresses a cable terminator.

Referring to FIG. 4 through FIG. 6, in which a terminator 60 is attached to the pusher rod 50, a component wire 61 is inserted into a hole 52, and an adapter 62 is set in the die cavity 31 of the receptacle 30. When applying a compressive force between two grips 12 and 22 of the handle bars 10, 20, the receptacle 30 and the base 40 remove together inwards from the position shown in FIG. 5 to a new position shown in FIG. 6 thereby engaging the adapter 62 and the terminator 60 in one piece. After the compression work is finished, the restoring force of the coil spring 54 urges the receptacle 30 and the base 40 to return to their initial position.

Furthermore, the receptacle and the base are replaceable with various sized ones to meet the requirement of compressing terminators of different sizes.

Figure 7:
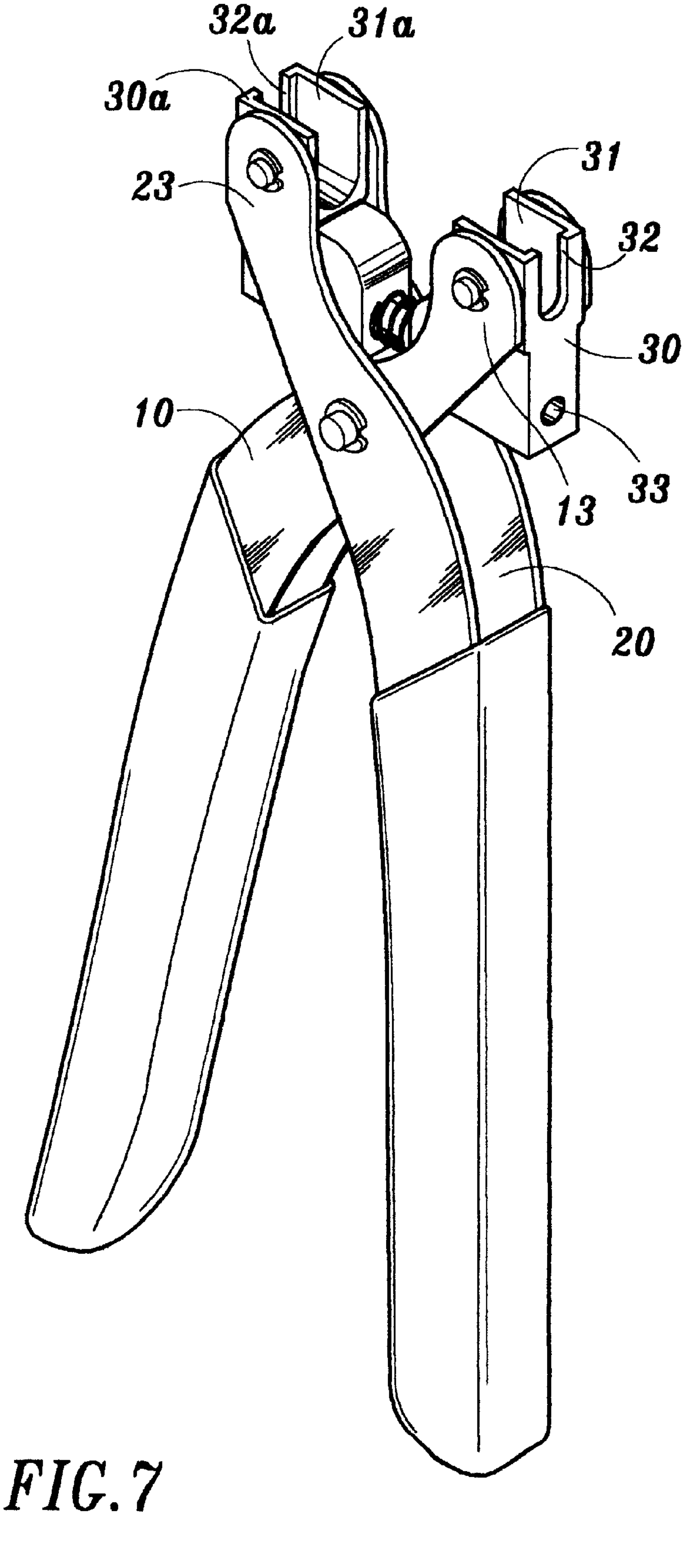
FIG. 7 is a three dimensional view of a second embodiment according to the present invention.
Figure 8:
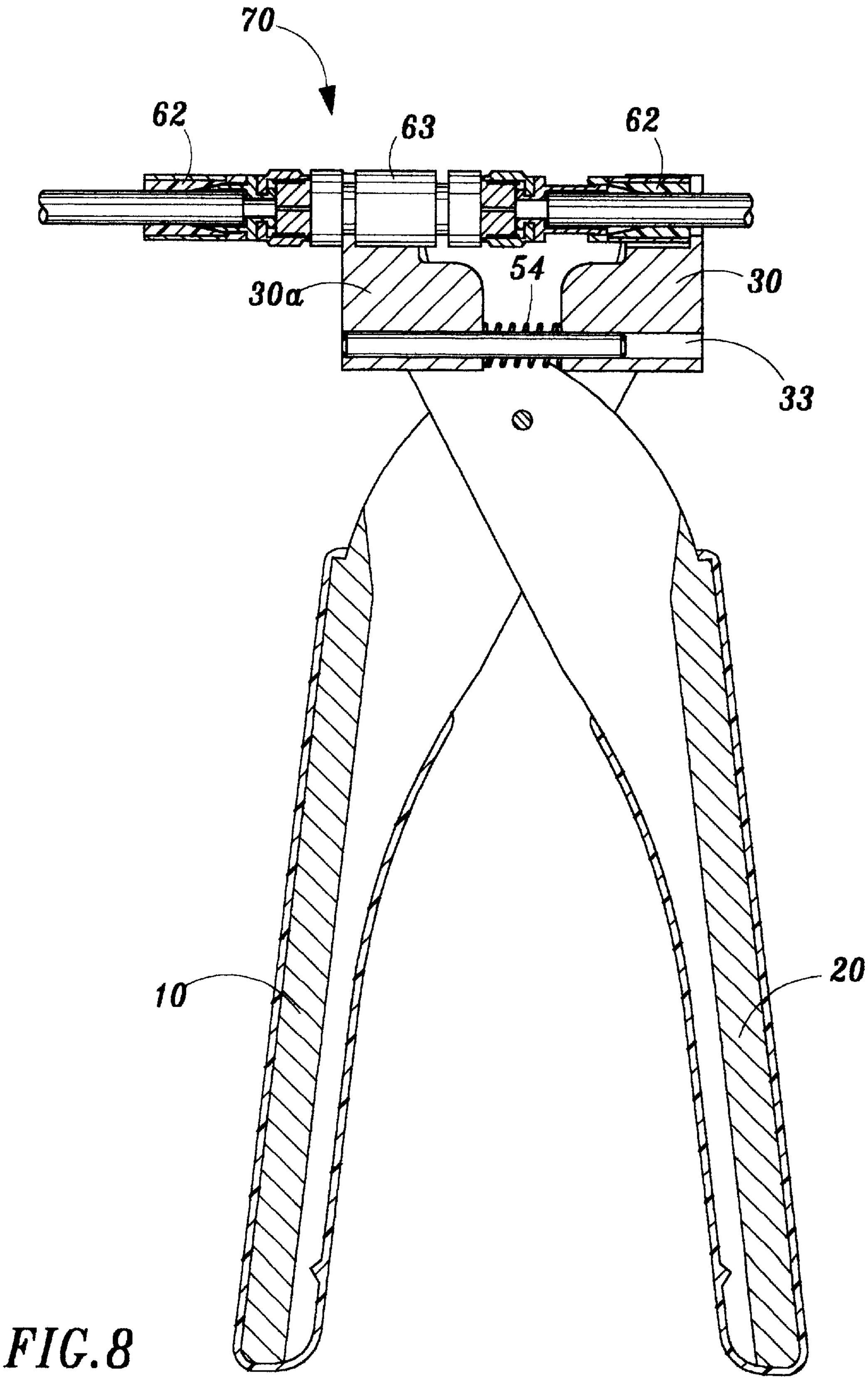
FIG. 8 is a cross sectional view showing the state that a double head cable terminator is under compression by the hand-operated press in a second embodiment of the present invention.

A second embodiment of the present invention is shown in FIG. 7. Herein, the compression part 13 of the handle bar 10 is replaced FIG. 7. Herein, the compression part 13 of the handle bar 10 is replaced by a receptacle 30*a* so that there are identically constructed receptacles 30 and 30*a* facing each other between the handle bars 10 and 20. Then, referring to FIG. 8, with the above structure, it is possible to make joint of a double head terminator 70. In the event of making joint of a double head terminator 70, first, placing the adapter 62 in the cavity 31 of the receptacle 30, second, setting a connector 63 in a die cavity 31*a* of the receptacle 30*a,* then proceeding to compression operation. The other side of the terminator may be treated with the same procedures.

Figure 9:
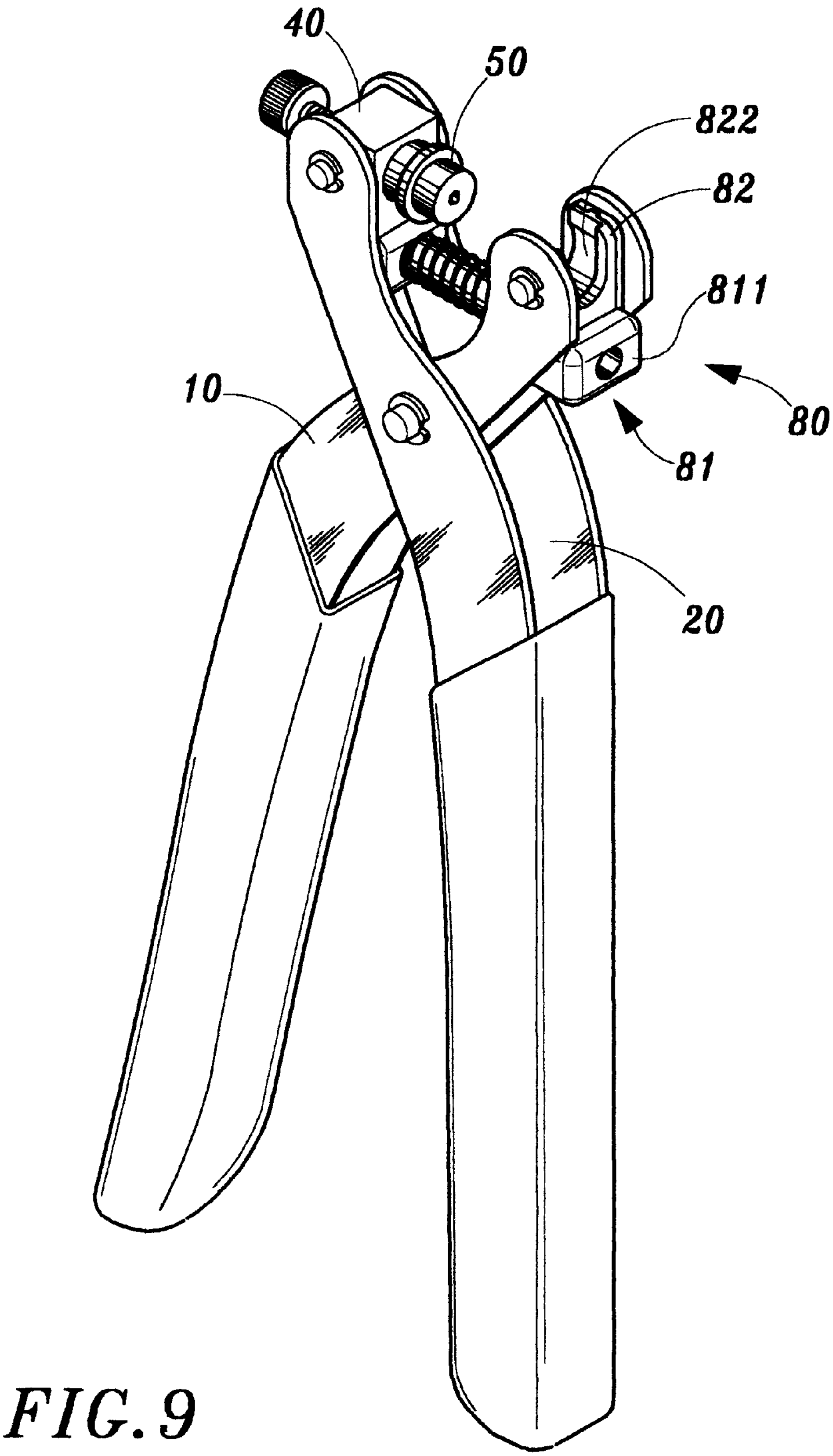
FIG. 9 is a three dimensional view of a third embodiment according to the present invention.
Figure 10:
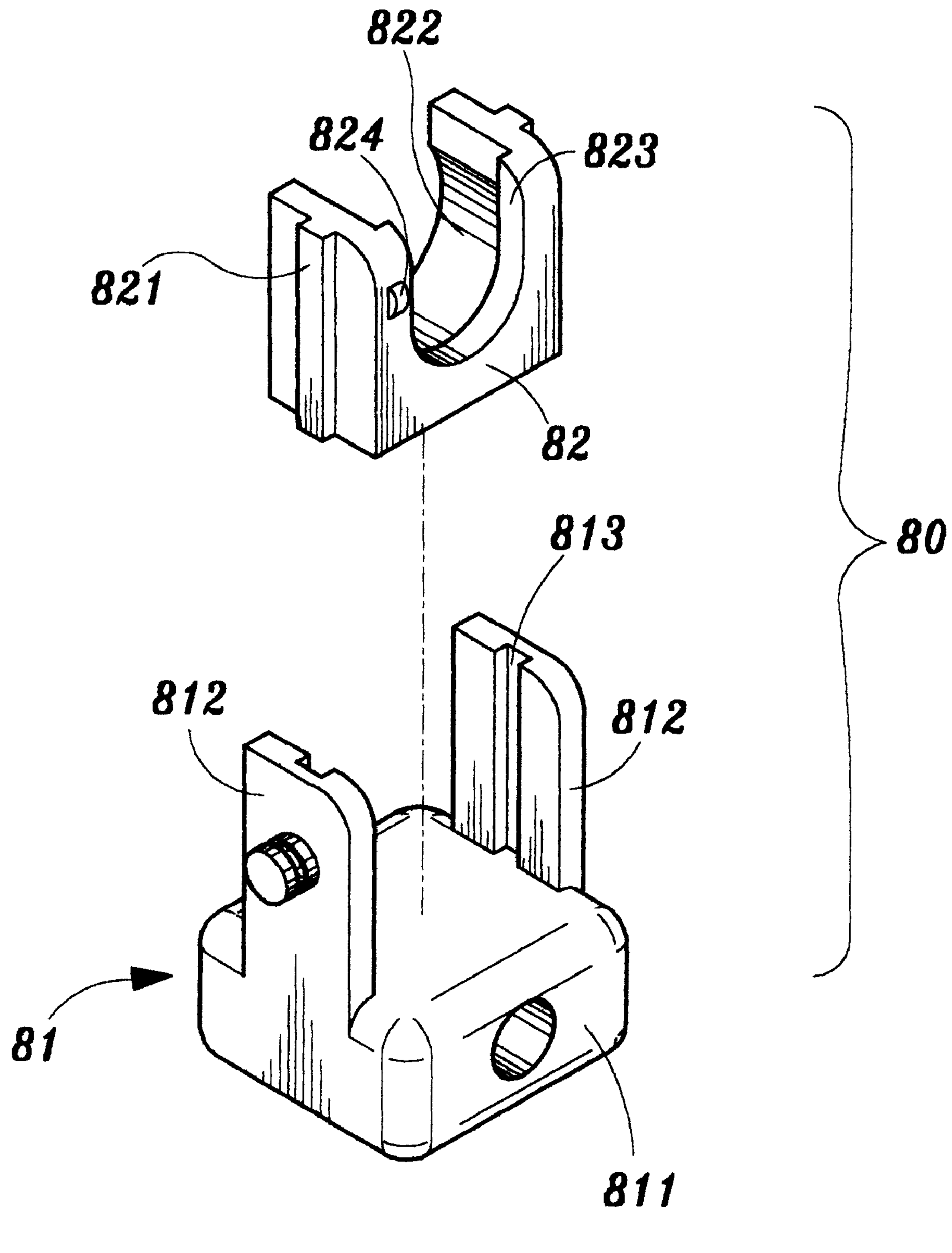
FIG. 10 is a three dimensional exploded view of the die set in a third embodiment of the present invention.

A third embodiment of the present invention is shown in FIG. 9 and 10, wherein, the handle operated press includes two handle bars 10,20; a base 40; a pusher rod 50 and an optional die set 80.

The die set 80 further includes a die holder 81 and a replaceable die block 82. The die holder 81 has a base 811 with two supporting plates 812 standing thereon apart from each other with a longitudinal spacing. A vertical groove 813 is formed at the middle of each inner wall surface of the two supporting plates 812 to accept insertion of a spacing protuberance 821 formed on the outer wall surface of the die block 82. A die cavity 822 with a flange 823 formed on its end for capturing a work piece thereat without escape is provided in the die block 82.

Figure 11:
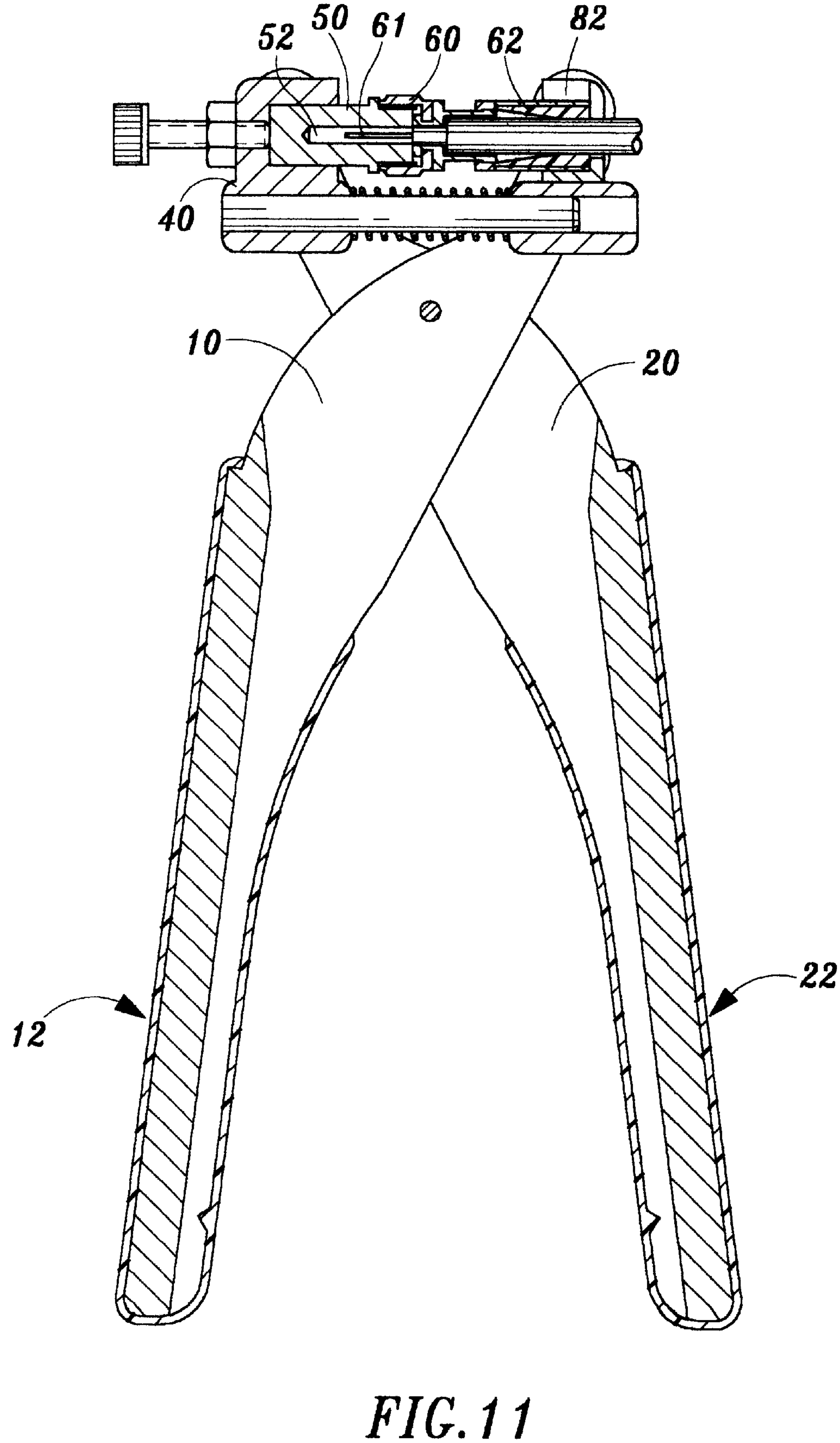
FIG. 11 is a cross sectional drawing showing the work pieces are settled in the respective locations of the hand operated press of the present invention.

Referring to FIG. 11, the terminator 60 is attached to the pusher rod 50 with its component wire inserted into the hole 52, while the adapter 62 is set in the die cavity 822 of the die block 82. By applying compressive force on the grips 12, 22, the base 40 and the die set 80 move inward simultaneously so as to engage the adapter 62 and the Further to this, there are many terminators with specific sizes, but they can be compressed with corresponding die blocks 82. A protuberance 824 formed on the die block 82 serves for the operator to picked up with fingers when replacing the die block 82.

Figure 12:
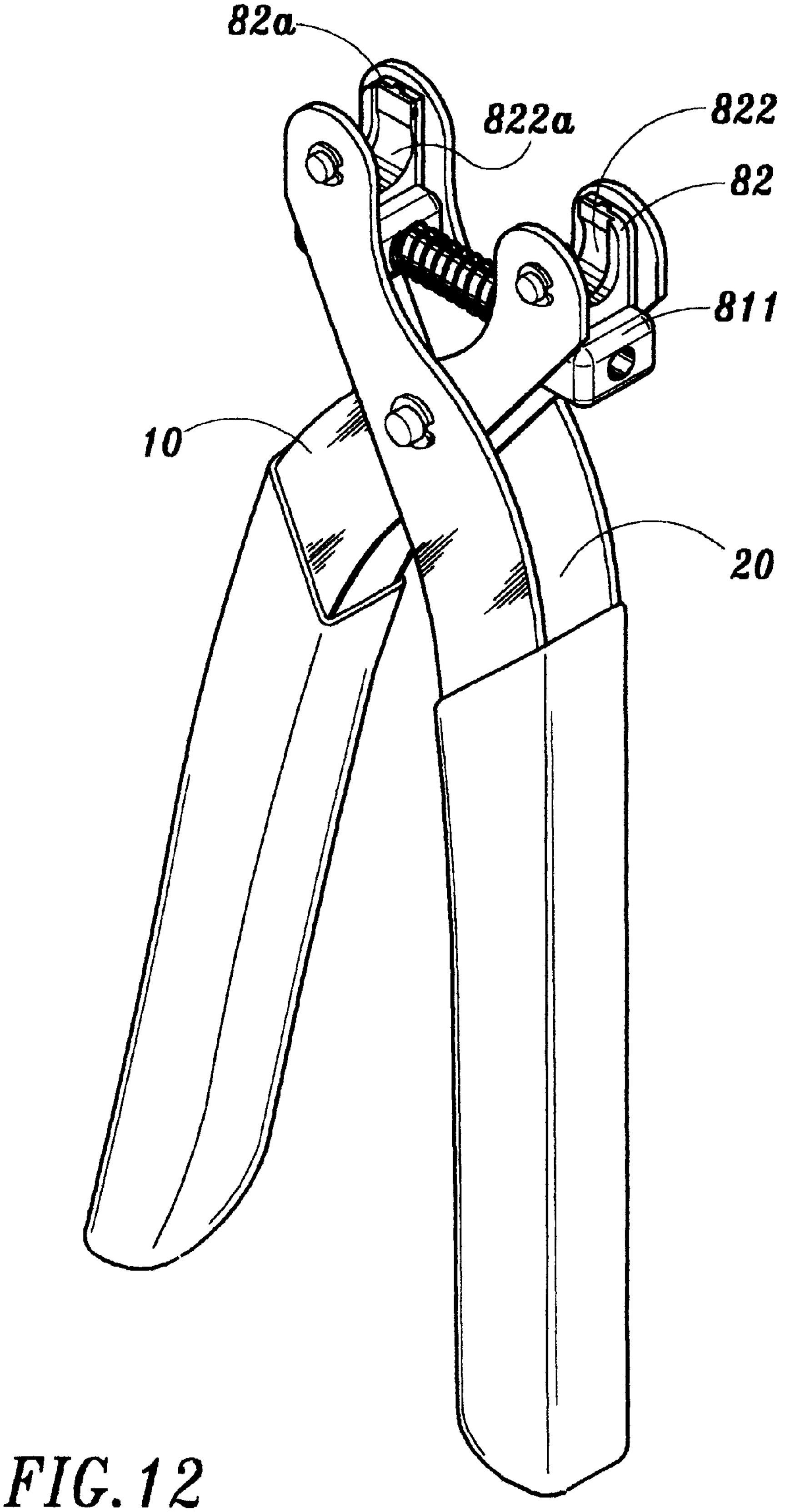
FIG. 12 is a three dimensional view of a fourth embodiment according to the present invention.
Figure 13:
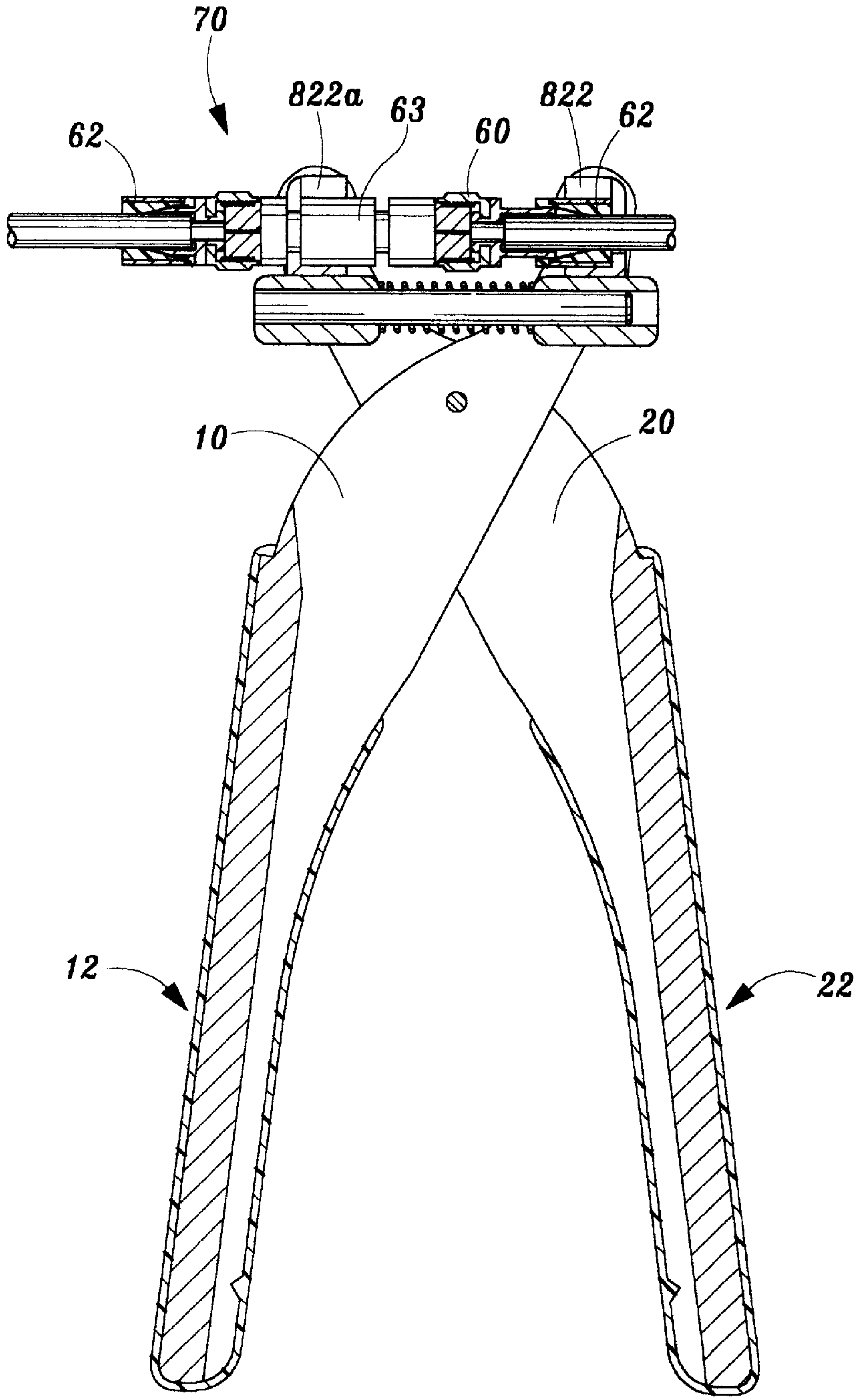
FIG. 13 is a cross sectional view showing the state that a double head cable terminator is under compression by the hand operated press in a fourth embodiment of the present invention.

FIG. 12 is a fourth embodiment of the present invention. As shown in FIG. 12, two die sets 80, 80*a,* with an identical structure are provided and correspondingly disposed in the compression parts 13,23 of the handle bars 10, 20 respectively, while two optional die blocks 82, 82*a* are fitted to the two die holders 81, 81*a* respectively. Finally, referring to FIG. 13, the double head terminator 70 may be compressed with the tool constructed as such. Upon compression, first, setting the adapter 62 in the die cavity 822 of the die block 82, second, setting the connector 63 in the die cavity 822*a* of the die block 82*a,* and finally proceeding to compression operation. The other side of the terminator may be treated with the same procedures.

Other embodiments of the present invention will become obvious to those skilled in the art in light of above disclosure. It is of course also understood that the scope of the present invention is not to be determined by the foregoing description, but only by the foregoing description, but only by the following claims.

What is claimed is:

1. A hand operated press for installing cable connectors by connecting an adapter to an outer sleeve of a cable terminator and one end of the cable in a sealed state, the press comprising:

two handle bars each having a grip at a lower end, and a compression part at an upper end, such that, when a compressive force is applied between said two grips, said two compression parts move toward each other along an axial direction;

a die set including a die holder and a replaceable die block, said die holder fixed to a first of said compression parts, and die block having a die cavity therein, and a flange formed at an end of said die cavity along the axial direction;

a pusher rod axially apart from said die set; and a base fixed to a second of said compression parts with said pusher rod installed thereon so as to approach said die set along the axial direction when a compressive force is applied between said two grips.

2. The hand operated press as claimed in claim 1, further comprising a stopper ring provided at a front end of said pusher rod.

3. The hand operated press as claimed in claim 1, wherein said two handle bars are moved a part from each other along the axial direction by a coil spring.

4. The hand operated press as claimed in claim 1, further comprising a protuberance on said die block to facilitate the die block being picked up.

* * * * *